United States Patent
Greer et al.

[11] Patent Number: 6,044,413
[45] Date of Patent: Mar. 28, 2000

[54] METHOD OF CONCURRENT BUS OPERATION FOR BUS CONTROLLED DEVICES OPERATING IN DIFFERENT CONTEXTS

[75] Inventors: Stephen J. Greer, Loveland; John L. Beckman, Fort Collins, both of Colo.

[73] Assignee: Hewlett-Packard Company, Palo Alto, Calif.

[21] Appl. No.: 08/916,474

[22] Filed: Aug. 22, 1997

[51] Int. Cl.[7] .................................................. G06F 13/00
[52] U.S. Cl. ............................ 710/21; 710/20; 710/58; 710/117; 710/124; 713/502
[58] Field of Search .................... 395/289, 552, 395/727, 826, 827, 825, 840, 841, 865, 866, 867, 903, 904; 710/20, 21, 45, 58, 117, 124; 713/400, 401, 502, 600

[56] References Cited

U.S. PATENT DOCUMENTS

| | | | |
|---|---|---|---|
| 3,810,103 | 5/1974 | Ricci | 340/172.5 |
| 4,319,338 | 3/1982 | Grudowshi et al. | 395/289 |
| 4,484,293 | 11/1984 | Minucciani et al. | 364/513 |
| 4,516,076 | 5/1985 | Pillari et al. | 324/418 |
| 4,536,838 | 8/1985 | Ringel et al. | 395/289 |
| 4,547,845 | 10/1985 | Ross | 395/289 |
| 4,710,893 | 12/1987 | McCutcheon et al. | 364/900 |
| 5,551,041 | 8/1996 | Beethe | 710/260 |
| 5,606,717 | 2/1997 | Farmwarld et al. | 395/289 |
| 5,671,370 | 9/1997 | Allen et al. | 710/125 |

*Primary Examiner*—Xuan M. Thai
*Attorney, Agent, or Firm*—Edward L. Miller

[57] ABSTRACT

A solution to the problem of undesired serialization of bus controlled instrument measurement delays for multiple instances of programmatically controlled measurement processes is to configure the bus operations and the control programs to allow the issuance of a command within the context of a first collection of such instruments, without having to wait for the corresponding data before issuing commands within the context of a second collection. This is done by instructing the equipment in the collection to signal that they have data instead of the more customary immediately issued "@ address talk", which is then followed by the delay needed by the equipment to make the measurement. Instead, the "have data" signals are associated with the devices that originated them and then the bus instructions that request the data are issued. In conjunction with this, the usual bus I/O commands in the controlling programs may be replaced with calls to a library that operates in just this fashion. The library also implements another solution suitable for those bus controlled instruments that do not possess the signaling capability. That solution is to simply wait a predefined time after the measurement command is issued before issuing the command to reply with the data. In the interim the bus interface card may be used for other transactions.

2 Claims, 5 Drawing Sheets

METHOD OF CONCURRENT BUS OPERATION FOR BUS CONTROLLED DEVICES OPERATING IN DIFFERENT CONTEXTS

BACKGROUND OF THE INVENTION

In many systems where a computer controls an instrument, item of test equipment or some other device, the control is exerted over a bus, such as that defined by the various versions of IEEE 488 (sometimes referred to as HP-IB or as GP-IB). Compared to the older technique of using a dedicated interface card per instrument, such a bus architecture is attractive for a number of reasons, including the flexibility and expandability that arise because of the notion of addressability that is incorporated in bus operations.

Now let us suppose that there were a first collection of instruments, test equipment or other devices, all having suitably different addresses on the bus and that cooperate with a controlling program executed by a computer that is also connected to the bus, to accomplish some useful end. Perhaps the desired result is a listing or plot of the return loss as a function of frequency for a microwave attenuator; the particular nature of the example is of no special concern. We shall term this assemblage a "first collection of equipment". Present in addition to the equipment that is on one side of the bus, are the computer itself and an interface that connects the bus to the computer. The control program executed by the computer has the necessary algorithmic content for whatever overall task or tasks that are to be performed. A collection of equipment and its control program create a "context".

Now further suppose that the task at hand is one that is of a production nature, where volume of work accomplished is important, as opposed to a laboratory setting where inquiry or demonstration is the primary goal. One way to increase the overall throughput is to duplicate the entire system, including another computer and bus interface. But upon brief reflection, you may well reply "Phooey, we have a multi-tasking operating system here running on a high powered workstation. There ought to be a way to avoid needing a second computer!"

There is a conventional way to avoid that need, and it is to equip the existing computer with a second bus interface, connect a second collection of equipment to it with a second run of bus cabling, and then control the second collection with a second instance of the control program. This works, but it requires an extra bus interface and set of cabling for each additional collection of equipment. Even if you were to bear the expense of, say three additional sets of stuff, you may well discover that the card cage of the computer hasn't the number of slots needed to accommodate the extra cards, given any other cards that may need to be there, too.

At this point one might consider putting all the collections on the same bus, with each collection operating within a unique portion of the bus address space. Then the different instances of the control program are each informed of the particular set of addresses they are to deal with. This avoids multiple instances of the bus interface, but to your ultimate annoyance, it is a real dog in terms of speed. It appears as if things are happening in serial fashion instead of in parallel.

Upon reflection it is clear what the problem is. Let us assume that each collection has a particular instrument therein, a voltmeter, say, and that one of the requested measurements of each of those voltmeters requires a significant amount of time. The essence of the problem is that bus controlled instruments are prone to tying up the bus for the duration of their response to a command. By this we mean that during the "significant amount of time" when one of those voltmeters is doing that "long" measurement the bus interface in the computer is not free to send commands to or receive data from other instruments on the bus; it must wait until the long measurement is complete and the results transmitted over the bus as data. (In the case of HP-IB there is an "@ address listen" followed by an instruction, which is then followed immediately by an "@ address talk" that requests the data. This period of waiting until the data comes back is what ties up the bus interface.) Thus it is that all the long waits are executed serially, rather than being overlapped. And while this would not be a problem if there were just the one collection (the measurement/control algorithm for each collection considered individually is probably serial within its own context, anyway), it does become a problem when the delays of one collection become visible in the execution of the control program for another collection.

Upon further reflection it will be appreciated that the above described situation can arise even when the various collections are not the same, and even have different controlling programs. The problem of delays that are visible outside their own contexts will still arise. That is, unless something is done to prevent it, the various delays will arrange themselves serially, and thus lower the overall rate of algorithmic execution.

SUMMARY OF THE INVENTION

A first solution to the problem of undesired serialization of delays for multiple instances of algorithmic processes is to configure the bus operations and the control programs to allow the issuance of a command within the context of a first collection, without having to wait for the corresponding data before issuing commands within the context of a second collection. This is done by instructing the equipment in the collection to signal that they have data instead of the more customary immediately issued "@ address talk", which is then followed by the delay needed by the equipment to make the measurement. Instead, the "I have data" signals are associated with the devices that originated them and then the bus instructions that request the data are issued. In conjunction with this, the usual bus I/O commands in the controlling programs may be replaced with calls to a library that operates in just this fashion. The library also implements a second solution suitable for those bus controlled instruments that do not possess the signaling capability. The second solution is to simply wait a predefined time after the measurement command is issued before issuing the command to reply with the data. In the interim the bus interface card may be used for other transactions.

DESCRIPTION OF A PREFERRED EMBODIMENT

Figure 1:
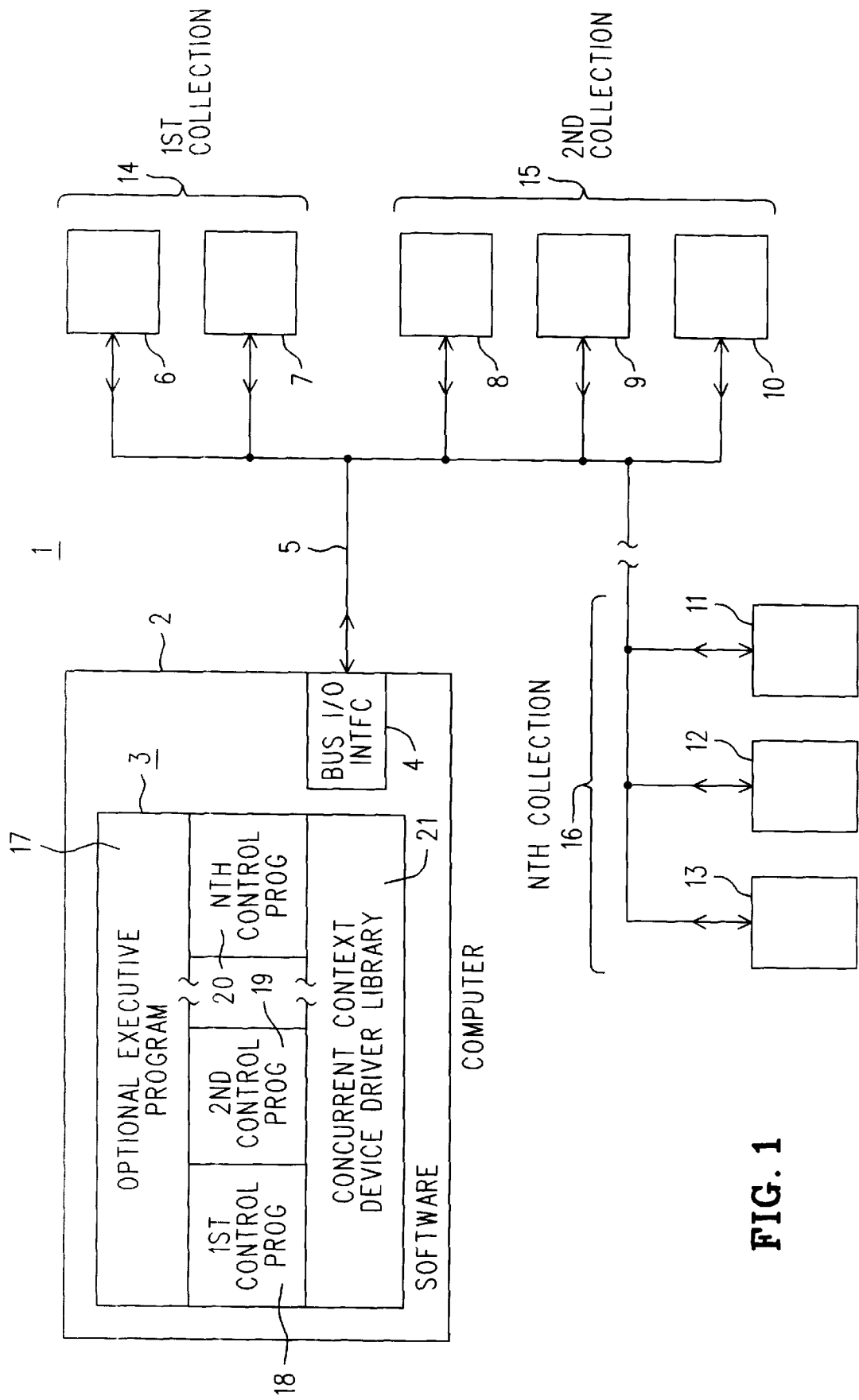
FIG. 1 is a simplified combined hardware and software block diagram of a computer controlled bus instrumentation system configured for operation in accordance with the invention.

Refer now to FIG. 1, wherein is shown a simplified combined hardware and software block diagram 1 of a computer controlled bus instrumentation system. The instrumentation includes a plurality of collections, which in the example shown are: a first collection of two instruments or other bus controlled devices 6 and 7; a second collection 15 of three instruments or devices 8, 9 and 10; and an nth collection 16 of instruments or devices 11, 12 and 13. The computer 2 includes a bus I/O interface 4, to which bus cabling 5 is attached and which is also attached in known fashion to each instrument or device in the various collections. The bus may be HP-IB (IEEE 488). Examples of instruments or devices that may be on the bus include, but are most certainly not limited to, voltmeters, analyzers, AC and DC sources, counters, switches, attenuators, power meters, power supplies, test sets, custom made gadgets, and the like.

Shown for convenience as being "inside" the computer 2 is an arrangement of software 3. This arrangement 3 is depicted as a simplified structure diagram. We have not indicated the presence of an operating system, although it is assumed that there is one present and that it supports the notion of "multi-tasking" in the unix sense, or its equivalent.

The easiest place to start in examining the structure diagram 3 is with the various control programs 18, 19 and 20. These are respectively labeled the 1st, 2nd and nth control programs. The 1st control program 18 contains the algorithmic content used to control the instruments or devices 6 and 7 in the first collection 14, such that the desired functionality of that first collection 14 is achieved. Likewise, the 2nd control program 19 does that same thing for the 2nd collection 15, as does the nth control program 20 for the nth collection 16. It will be understood that there may be only two collections, instead of the three or more that are indicated in the example. Furthermore, it will be appreciated that the various control programs might simply be different instances of the same program, or they might each be entirely different programs.

Now, these control programs might be self-contained, in the sense that there is no higher level of abstraction to which they are algorithmically subordinate to. Say, they each have their own user interface and configuration mechanisms. They might employ lower level utilities and invoke the operating system for housekeeping tasks, but would not be modules in a larger system. In such as case the optional executive program 17 would be absent.

On the other hand, the control programs might be just modules that are part of a flexible, expandable and re-configurable system capable of different modes of operation. Say, for instance, the overall task is that of performance testing of cellular telephones. In terms of complexity and functionality, a cell phone can be viewed as an extensive co-operating collection of sub-systems. In such a case the various control programs deal with the respective sub-systems. The various control programs are then integrated into a unified whole with the executive program 17, which we have simplified down to a mere one block. In actual practice, the executive functions are many and multifaceted, and includes such issues as the user interface used for direct control while in operation, configuration, self-test, report generation and serial number tracking, etc. Because of this actual complexity, one would expect the executive program 17 to include a large number of additional modules, but which are not of significant interest to our present discussion, and which have accordingly been omitted for the sake of brevity.

Notice now the lowest level of abstraction in the software structure diagram 3, the box 21 labelled "concurrent context device driver library". Recall that we earlier stated that a context (for our purposes here) is the execution environment for a control program and its associated collection of devices or instruments. In a nutshell, the concurrent context library 21 handles the I/O operations initiated by the control programs, and arranges that any significant delays are overlapped instead of allowed to self-serialize as described earlier above.

Now, let's dwell for a moment on the general nature of what it is that the concurrent context device driver library 21 has to do. As noted above, the overall goal is to produce overlapped delays in those cases where an issued instruction or command to a device in a collection will take a significant amount of time to accomplish. As the explanation proceeds, it will be useful to identify certain assumptions that are used in that explanation. The first of these is that the nature of the bus operation for "making a measurement", and perhaps also for some other instructions or commands that a device might be capable of performing (very device dependent), allows separating the bus command to make the measurement or do the action from the bus command to transmit the associated results. If the command/control architecture of the bus does not allow this, then you are doomed unless it is possible to resort to multiple bus I/O cards. So, this assumption is a necessary one.

Next, we will develop the example that follows on the premise that the bus in use is HP-IB. This is not a necessary assumption, merely a useful one. Also, the overall nature of the system 1 in FIG. 1 will be assumed to be that of a doomsday quality cellular telephone test station for use at, say, the factory. This also is merely a useful assumption, not a necessary one.

All that said, it will be appreciated that at the lowest level, the problem comes down to how to handle command sequences such as SEND COMMAND "MAKE MEASUREMENT X" TO BUS ADDRESS Y USING THE BUS I/O CARD HAVING SELECT CODE Z, and SEND COMMAND "REPLY X RESULTS" TO BUS ADDRESS Y USING THE BUS I/O CARD HAVING SELECT CODE Z.

The first issue that comes to mind is how to decide if anything special needs to be done, anyway. Say, the command MAKE MEASUREMENT X was replaced with RESET YOURSELF. We do not expect a reply; thus, we need to distinguish cases of this sort. Next, the taking of measurement X might be an extremely brief operation, best left as is, so to speak. (It must be admitted that the solution for long measurements set out below has its own overhead. Thus, if the operation is sufficiently brief, then it is better to not interfere. An example would be an isolated "REPLY STATUS".) Accordingly, there needs to be an agency that interprets "MAKE MEASUREMENT X" to decide if this is a case where something needs to be done, or not. To do this it must maintain information about what kind of device is at bus address Y for the bus associated with the I/O card at select code Z. In simple cases where the system 1 is pre-configured and is never expected to change, this information can be hard coded into the concurrent context library 21. It is more probable, however, that reconfigurability, expandability, etc., are desirable properties, and that there are configuration tables that can be altered by the user. These configuration tables might actually reside in the executive program's collection of modules. However the mechanism is provided, the concurrent context library 21 needs to be able to decide whether to intervene or to simply do the requested operation in a conventional fashion.

If the decision is to intervene (i.e., there will be significant delay and it is to be overlapped), then there is still one more issue to examine. Basically, there are two different ways to achieve the overlap. In each the command sequence SEND COMMAND "MAKE MEASUREMENT X" TO BUS ADDRESS Y USING THE BUS I/O CARD HAVING SELECT CODE Z, is sent without(!) automatically sending the sequence SEND COMMAND "REPLY X RESULTS" TO BUS ADDRESS Y USING THE BUS I/O CARD HAVING SELECT CODE Z.

The first way is to put the instrument or device of interest into a mode of operation where it "requests service" when the measurement is complete. Then the MAKE MEASUREMENT X sequence is sent. The device will issue a service request upon completion of the measurement. The service request will be noticed on the bus, an inquiry (poll) conducted to see who needs service. (Service requests are anonymous, and multiple pending requests for different devices might, if needed, be resolved by a priority scheme based on bus address.) After determining that it is the device at bus address Y for the I/O card at select code Z, the result of the measurement is fetched by issuing the command sequence SEND COMMAND "REPLY X RESULTS" TO BUS ADDRESS Y USING THE BUS I/O CARD HAVING SELECT CODE Z. During the interim between the two command sequences the bus I/O card at select code Z is free to perform other bus transactions originating in other contexts.

The second way is useful when either the device of interest does not possess the service request mode of operation, or when the overhead of a polling operation is a burden and it is accurately known ahead of time just how long a time the making of measurement X is going to take. Briefly, the second way is to issue the command sequence SEND COMMAND "MAKE MEASUREMENT X" TO BUS ADDRESS Y USING THE BUS I/O CARD HAVING SELECT CODE Z and then put that executing instance of the driver (part of library 21) to sleep (i.e., suspend it) for the duration of time needed to make the measurement. After the driver wakes back up the concluding command sequence SEND COMMAND "REPLY X RESULTS" TO BUS ADDRESS Y USING THE BUS I/O CARD HAVING SELECT CODE Z is issued. As before, the I/O card at select code Z is available for other bus transactions (originated by non-sleeping drivers) during the interim between the two command sequences. It will be understood that, in the fashion of modern multi-tasking operating systems, there can be many copies (instances) of a program running "at the same time". Thus, if one of those instances puts itself to sleep for a certain period of time it has no ill effect whatsoever on any of the other scheduled instances; they continue to execute, as before, and are free to initiate bus transactions using the bus interface card at select code Z.

Figure 2:
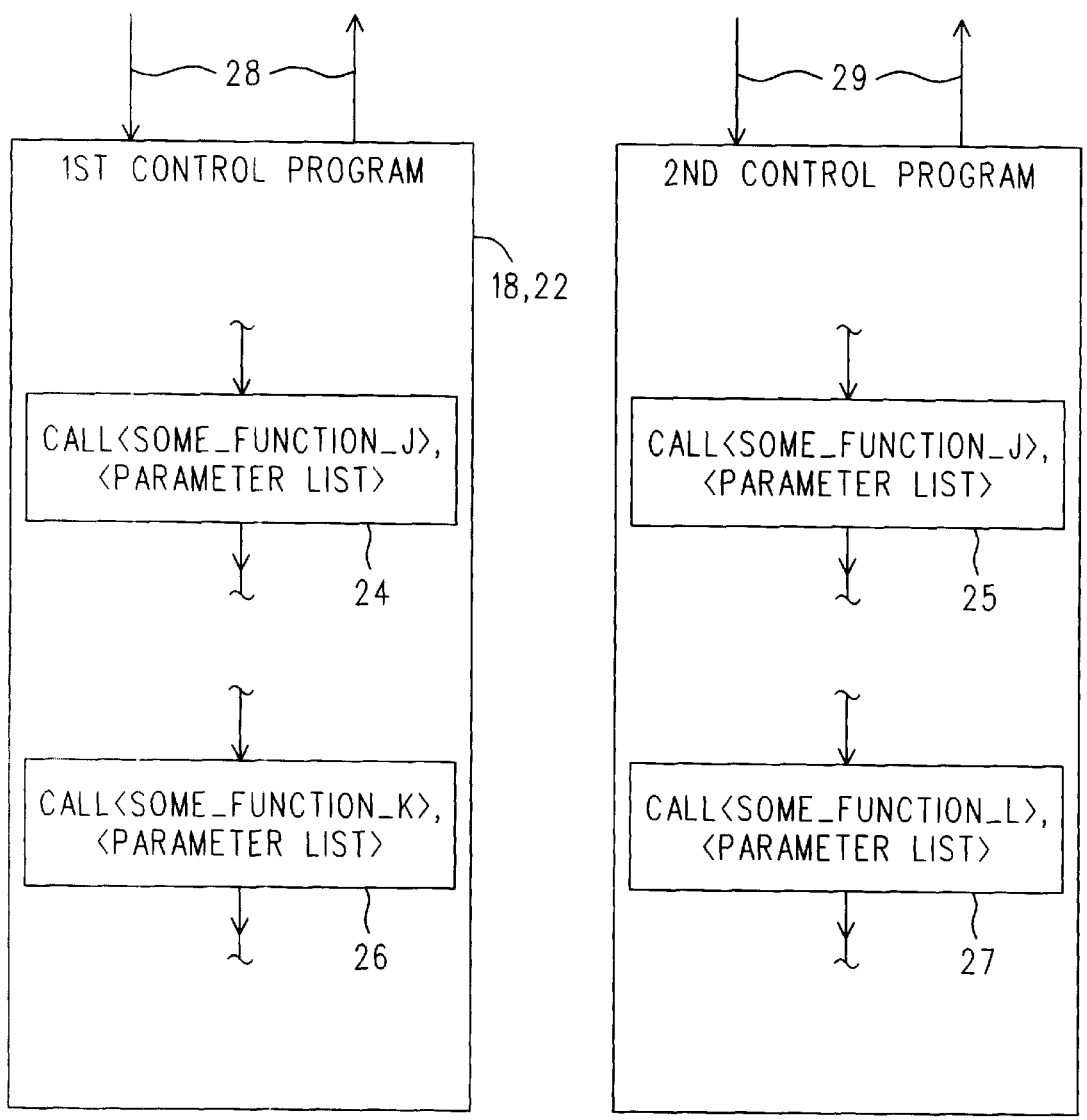
FIG. 2 is a simplified software structure diagram indicating how algorithmic control programs invoke the concurrent context device driver programs associated with the bus controlled instruments or other devices involved in performing the algorithm.

Refer now to FIG. 2, wherein are shown simplified representations of the 1st and 2nd control programs (18, 22 and 19, 23, respectively). The algorithmic content of these control programs has been omitted; it is sufficient for us to know that each has something to do with measurements made by bus controlled devices. Examples of possible tasks accomplished by these control programs include checking power supply voltages under varying conditions, and monitoring output RF power at different measured frequencies. Whatever the actual nature of these tasks, arrows 28 and 29 respectively indicate the communication between these control programs 22 and 23 with the environment that started them. In one embodiment where the control programs are essentially stand-alone applications, that environment might be simply the operating system itself, and the arrows would include representing commands from the user and returning data for display or other use. In another embodiment that environment would be an executive program 17 (as shown in FIG. 1) whose task it is to respond to instructions from the user (or maybe even some other program) and integrate a number of control programs into an algorithmically controlled activity whose level of abstraction is beyond that of the algorithms found in the control programs themselves. That is, the control programs 18/22 and 19/23 simply function as components in a larger task described at the level of the executive program 17.

Here is what to note about the control programs 22 and 23. Observe that the 1st control program 22 includes as examples an instance 24 of CALL <SOME_FUNCTION_J>, <PARAMETER LIST>. We have used the generic label "SOME_FUNCTION_J" in place of a more human readable and descriptive term that would be used in an actual instance, such as: "MEASURE_COMMAND_CHANNEL_POWER", or perhaps "MEASURE_DATA_CHANNEL_FREQUENCY". The function name is associated with a particular type of measurement instrument. The parameter list associated with the function identifies what action or command that instrument or device is to perform. If there should be two or more of the same instrument model on the bus (say, two of the same model digital multimeter), then they can either be named differently (DMM1 and DMM2) with respectively different functions associated therewith ("MEASURE_VOLTS_WITH_DMM1" and "MEASURE_OHMS_WITH_DMM2"), or, there could be a single function that included in its parameter list a value that identified (say, by bus address) which DMM is intended.

Lastly, note that while the 1st control program 22 is shown as using two different instances 24 and 26, there is no reason why the 2nd control program 23 can't also have an instance of the same function call as instance 24 in the 1st control program 22. Let's say that those instances 24 and 25 each operate a (different!) HP 3458A DMM. The operating system simply schedules another copy of <SOME—FUNCTION—J> with different parameters, according to how that function was called from its host environment (either the 1st control program 22 or the 2nd control program 23).

The most likely case is that each type, class, or model number has its own associated function, and through that, its own concurrent context device driver. However, certain variants of this scheme are certainly feasible. These include the case where different named functions invoke the same concurrent context driver, but with different parameters, and the case where a function-driver pair are simply written to deal with a class of related instruments (e.g., the HP 3456A and the HP 3458A, which are both high performance DMM's). At any rate, the important point to note here is that a called function (24/25/26/27) invokes an associated concurrent context device driver 21 (in FIG. 1) or 30/35/36 (in FIGS. 3A–3C).

Figure 3A:
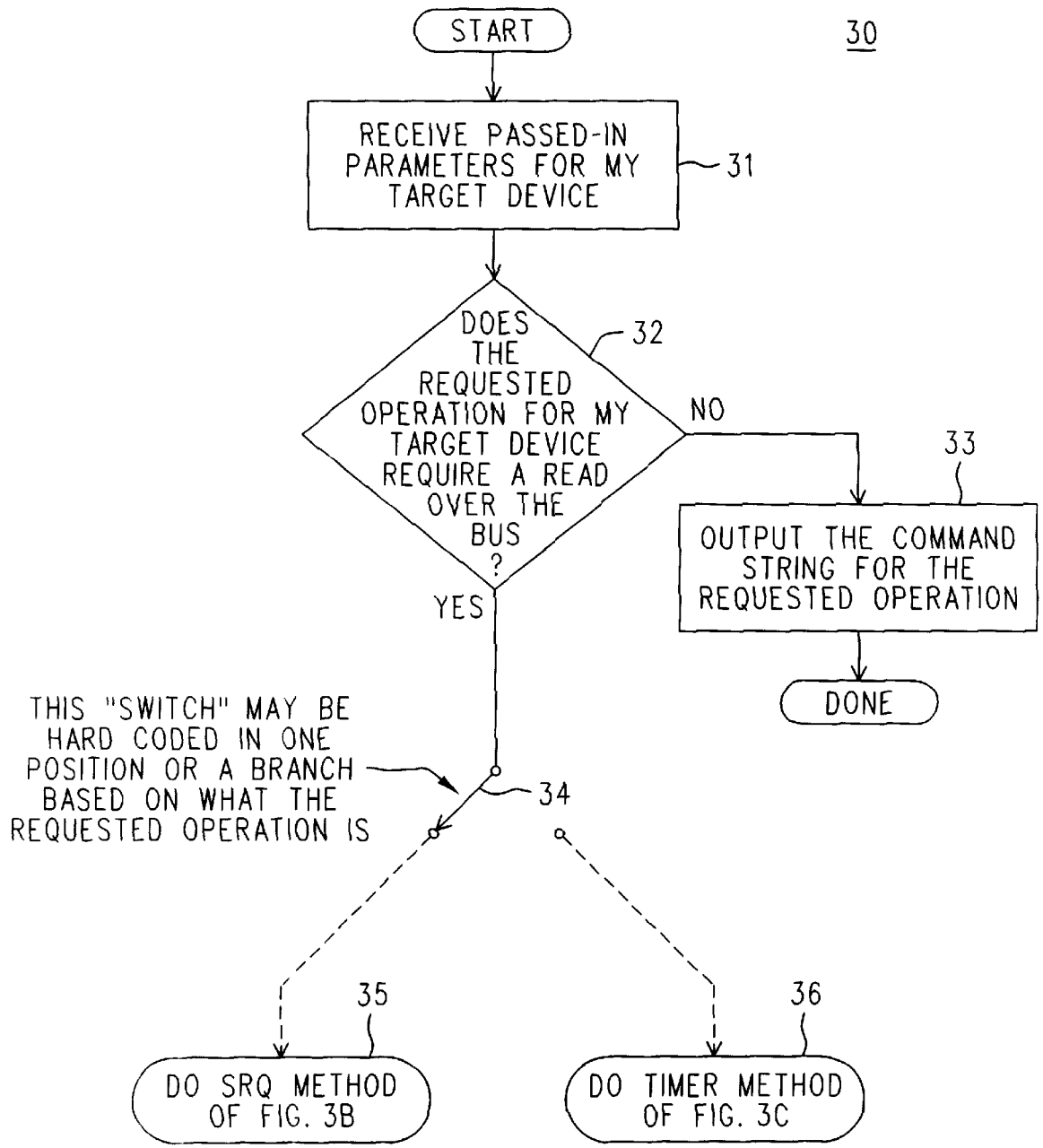
FIG. 3A is an a simplified flow chart of an initial portion of a concurrent context device driver program, and which subsequently branches to one of the routines depicted in FIGS. 3B and 3C.
Figure 3B:
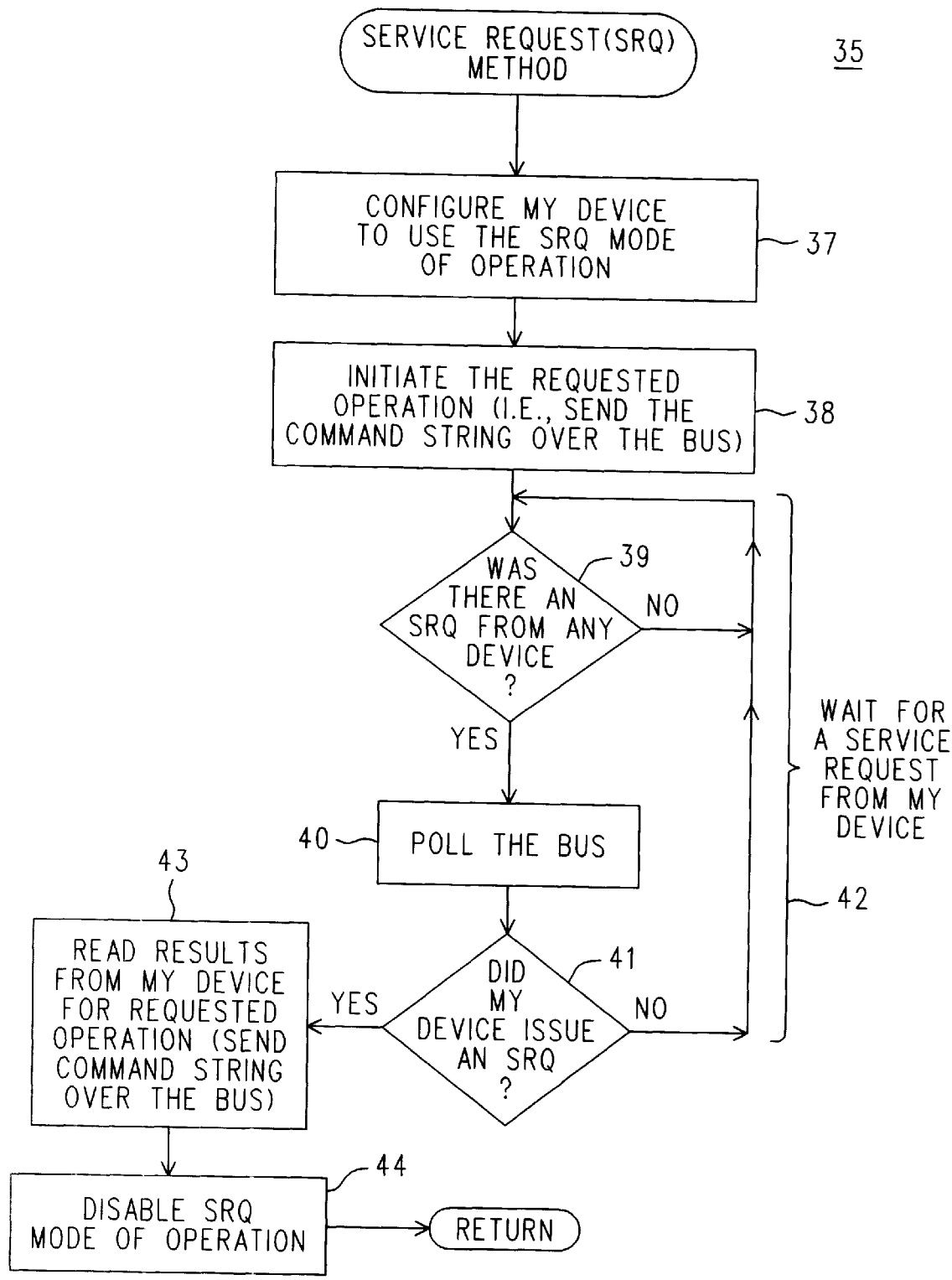
FIG. 3B is a simplified flow chart of the general structure of a service request oriented device driver routine useful as part of the concurrent context device driver library of FIG. 1.
Figure 3C:
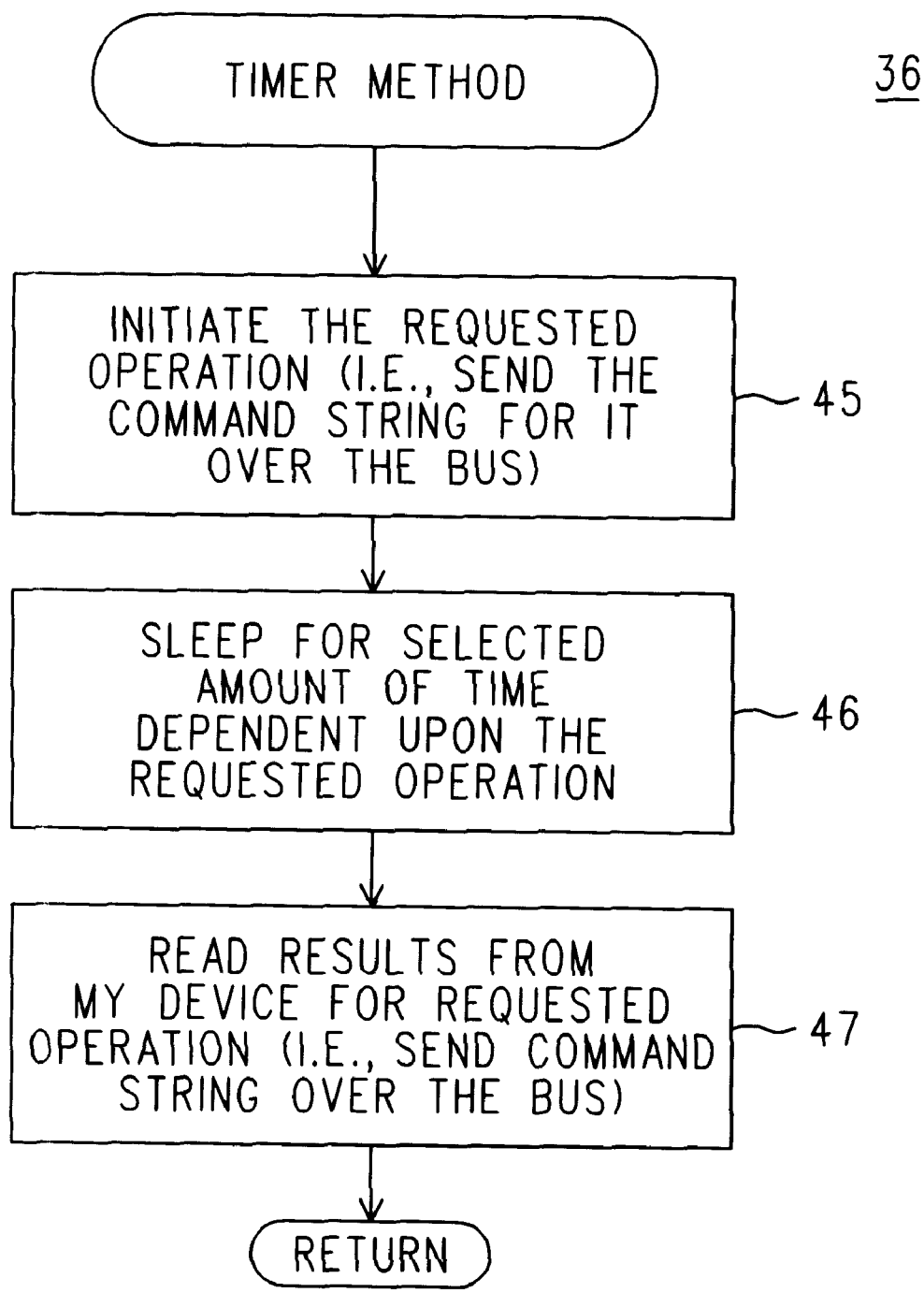
FIG. 3C is a simplified flow chart of the general structure of a non-service request timer oriented device driver routine useful as part of the concurrent context device driver library of FIG. 1.

Refer now to FIGS. 3A–3C. Beginning in FIG. 3A is a simplified flow chart 30 that depicts an initial segment of activity for an instance of some concurrent context device driver. The first activity 31 is to receive the passed-in parameters (if any) for the associated target device or instrument on the bus. The legend in the box 31 calls this "my" target device. This is a literary mechanism to remind the reader that there may well be different instances of the same concurrent context device driver running, and that it thinks "my" target device is different than "your" target device, owing to different passed-in parameters.

The next activity 32 is to determine if the requested operation involves a read over the bus (i.e., will the device send data to the computer 2 over the bus?). If it does not, then the issue of concurrency as we have set it out does not arise, and it is sufficient to simply send the associated command string at activity 33 and be done with it.

If there is a bus read, however, then decision activity 32 branches to a "switch" 34, and via the switch to either the FIG. 3C of FIG. 3B for an SRQ method segment 35, or to the routine of FIG. 3C for a timer method segment 36.

A word or two is in order about the switch 34. Any particular concurrent context device driver may have just one, just the other, or both of the "positions" of the "switch" 34. It depends upon what makes sense for the instrument or device involved. Suppose that it were a really old model that did not support the service request (SRQ) mode of operation. Then the transfer of control out of decision activity 32 would be a hard coded transition to time method code segment 36, and SRQ method code segment 35 would be altogether absent. On the other hand, certain modem instruments might have no need whatsoever for the timer method, and their drivers would simply transition to segment 35, with segment 36 being absent. These conditions may well follow simply from the model of the instrument or device, and would thus be hard coded in the associated concurrent context device driver. Yet there may be device where it makes sense to invoke segment 35 or segment 36 based on what operation the instrument or device is to perform. The idea here is that some operations may be of short enough time interval (or precisely known, even if long) that the extra overhead of the SRQ case adds more time than the simple-minded timer case. In such circumstances the switch 34 will be an actual piece of code that selects which branch to make based on pre-encoded criteria.

Assuming now that code segment 35 of FIG. 3B is to be executed, its first activity 37 is to configure the ("my") device to use the SRQ method of operation. This will involve the sending over the bus of some string of command characters (or signals), and will depend on the instrument itself, and perhaps the nature of the bus. The next activity 38 is to initiate the requested operation, by sending the appropriate string of command characters or signals over the bus. It is at this point that the "long delay" of our earlier discussion begins, and with it, the opportunity to achieve concurrent operation.

The next activity is the decision 39, based on the occurrence of an SRQ from any device on the bus. The decision activity 39 loops upon itself so long as the answer is "NO". In the event of a "YES" we need to find out if it was "my" instrument that did it, since it might have been "yours", instead. Thus, in the event of a "YES" the next activity 40 is a poll of the bus. This provokes each instrument capable of doing so to answer the poll in a way described by the standard for that bus. In the case of HP-IB the preferred poll is a serial poll, where individual instruments are asked, one at a time, if they have an outstanding unserviced instance of SRQ. In a conventional environment a single routine would individually ask that question of all instruments on the bus, and deal with the results as appropriate. In the present preferred embodiment this "concentration" of the polling activity is not needed. Each concurrent context device driver that is executing learns that there has been an SRQ, and merely asks its associated device if it has an outstanding unserviced SRQ. Each device gets so asked, since each has an associated driver. What is not guaranteed is the order in which they get asked, since that is essentially a function of how the operating system schedules slices of execution time for the various programs that are running. Devices that are associated with drivers that are not executing (i.e., no pending operation for that device) are not polled.

(The HP-IB also supports a parallel poll that will produce bits in a register of the I/O card that can be read by the HP-IB I/O card hardware driver routine. Each bit position corresponds to a different address on the bus, and a set bit indicates that the associated instrument has an outstanding SRQ. This is less preferable for at least two reasons. First, it imposes a "hidden" priority scheme that the concurrent context device drivers are unable to influence, and second, the parallel poll mechanism severely limits the number of instruments that can be polled.)

From the above-described serial polling it is possible to answer the question of decision activity 41: "DID MY DEVICE ISSUE SRQ?" If the answer is "NO", then the routine continues to wait until the next SRQ by looping back to decision activity 39. If the answer was "YES", then the routine branches to activity 43, where the results of the requested measurement are read by sending out the appropriate string of command characters or signals on the bus. After that activity 44 disables the SRQ mode of operation for "my" instrument, and executes a RETURN out of the function.

The alternative to the SRQ method is the timer method, which is shown as segment 36 in FIG. 3C. Its first activity 45 is to initiate the requested operation, whereupon the segment puts itself to sleep (e.g., suspends itself by a suitable call to the operating system) for a selected amount of time, dependent upon the requested operation. (It could also simply loop around a counter variable to bum up time, but that is not as reliable as to the actual amount of time used, since the operating system may variably allow more or less execution time for that program in a multi-tasking environment, rendering imprecise the resulting real-time value of delay. It is also wasteful of CPU resources, since it devoted execution cycles to a program that is not doing anything.) Concurrency is achieved here because there is no immediate attempt to read from the device. Once the routine wakes back up and resumes execution, the next activity 47 is to read the results from "my" device. After that, there is a RETURN from the function.

What is claimed is:

1. A method of performing concurrent measurements with a plurality of bus controlled instruments, the method comprising the steps of:

(a) initiating a first measurement within a first context comprising a first instrument and an associated first control program executing on a computer;

(b) initiating a second measurement within a second context comprising a second instrument and an associated second control program, the first and second instruments being connected to a first bus, the second control program executing on the same computer as the first control program, and the first bus being connected to that computer by an I/O card;

(c) subsequent to the expiration of a first selected time interval begun with step (a), issuing with the first control program bus commands that instruct the first instrument to send data for the first measurement over the first bus; and (d) subsequent to the expiration of a second selected time interval begun with step (b), issuing with the second control program bus commands that instruct the second instrument to send data for the second measurement over the first bus.

2. A method as in claim 1 wherein at least a portion of the first and second selected time intervals are concurrent.

* * * * *